July 21, 1936.  F. W. STONE  2,048,576
APPARATUS FOR OIL FRACTIONATION
Filed Dec. 16, 1933  3 Sheets-Sheet 3
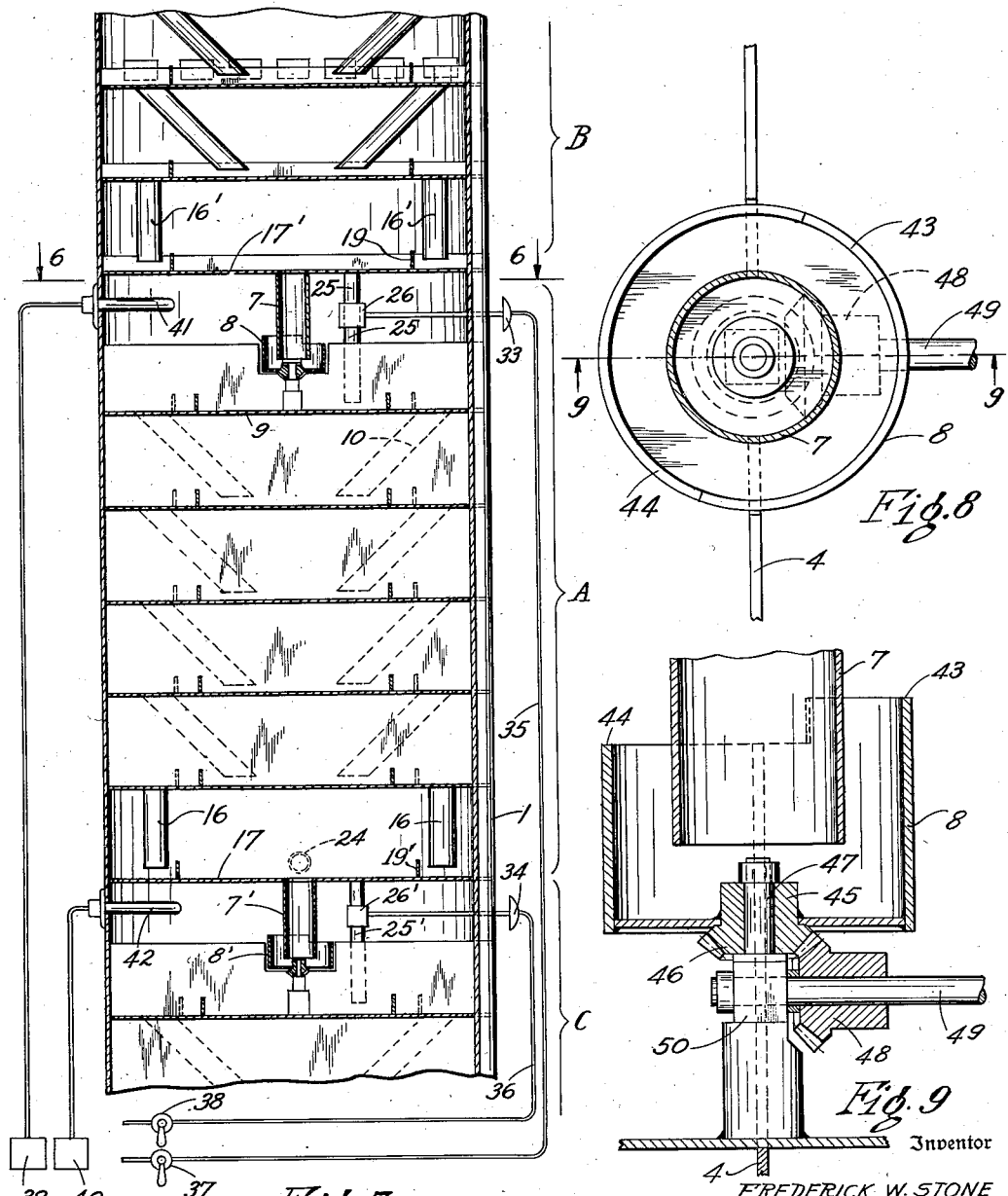
Inventor
FREDERICK W. STONE
By Richey & Watts
Attorneys Patented July 21, 1936

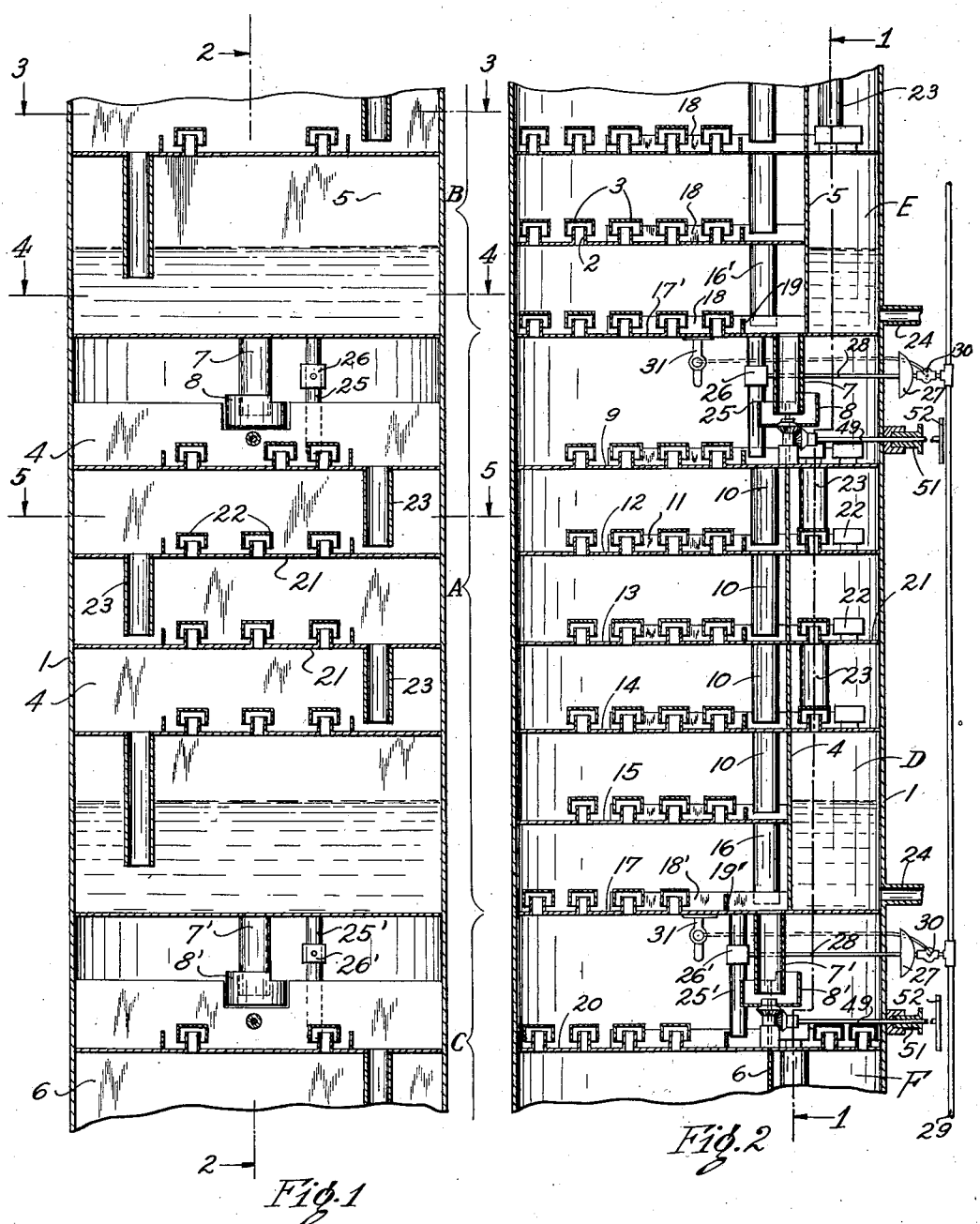

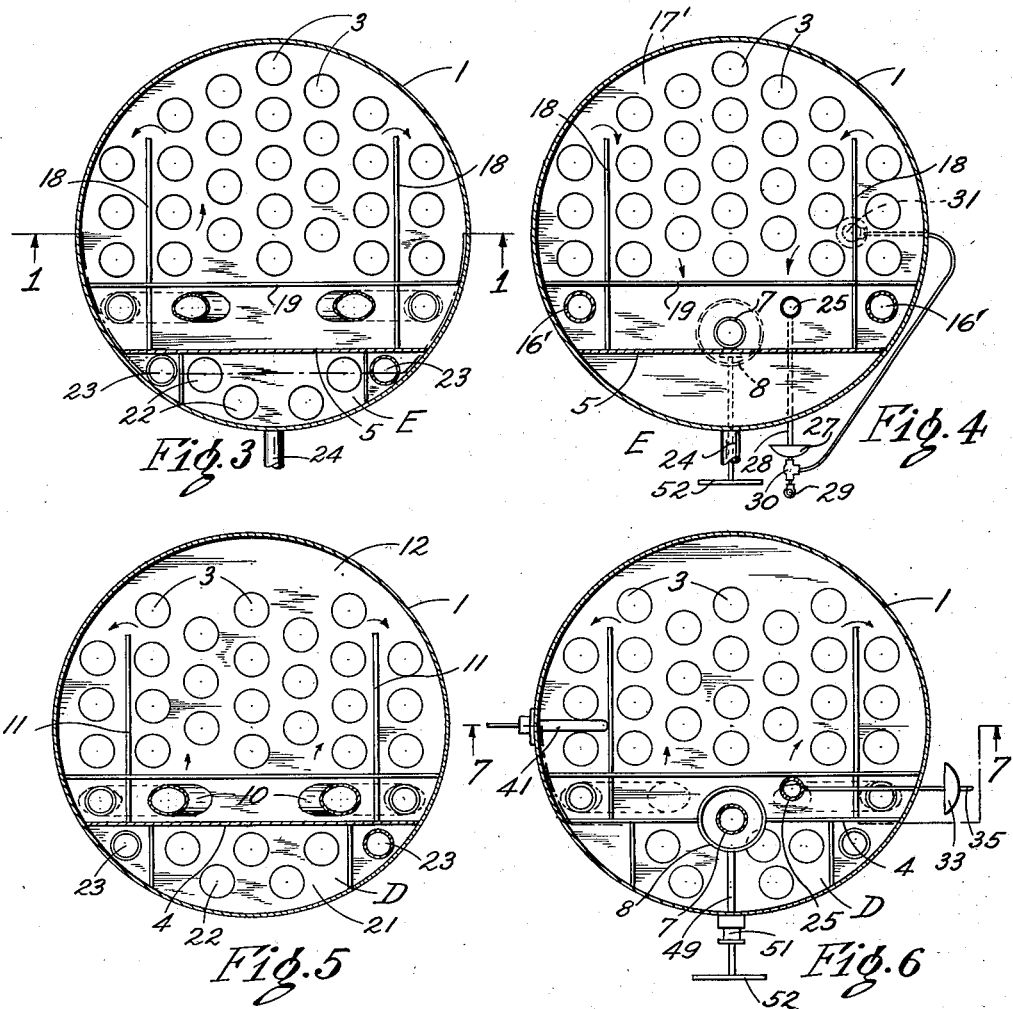

2,048,576

UNITED STATES PATENT OFFICE 2,048,576

APPARATUS FOR OIL FRACTIONATION

Frederick W. Stone, Cleveland, Ohio

Application December 16, 1933, Serial No. 702,731

11 Claims. (Cl. 196—94)

This invention relates to fractional distillation and more particularly to an improved method of and apparatus for fractionally distilling composite liquids such as hydro-carbon oils and separating such liquids into a number of constituents having different boiling points.

In the production of petroleum products such as gasoline, lubricating oils, etc., from crude oil it is customary to subject the crude oil to fractional distillation in which the raw material is heated to a temperature at which at least a portion thereof is vaporized and the resulting complex vapors then successively condensed and the resulting liquids separated and collected. In carrying out the fractional distillation process it has been proposed to subject the side stream liquids so collected to additional heat, supplied by steam or otherwise, to strip such liquids of undesired low boiling point constituents which may have been withdrawn therewith.

In the co-pending United States patent application of James M. Garrison, Serial No. 645,266, filed December 1, 1932, with which I am familiar, an improved method of and apparatus for fractional distillation is disclosed in which a bubble tower is provided having a plurality of side stream stripping sections disposed within the shell of the tower, the stripping sections being of successively increasing cross sectional area from the top of the tower down. These stripping sections are disposed in a generally cylindrical shell, the main vapor path through the tower being made up of a series of sections or zones of successively enlarging cross sectional area from the lower part of the tower upwardly. This type of tower arrangement affords certain definite advantages in efficiency of operation and in economy of construction and maintenance. In the apparatus disclosed in the above noted Garrison application means are provided for dividing the reflux liquid at a point just above each of the side stripping sections and causing a definite proportion of the liquid to flow into the stripping sections and the remainder to flow on down through the next fractionating zone.

The present invention relates to certain modifications and improvements in the general type of tower and fractionating method described and claimed in said Garrison application.

I have found that by providing means for causing a certain quantity of reflux liquid to flow from one fractionating section or zone of the tower to the zone below and also providing means for dividing the remainder of the reflux so that a certain proportion of this remainder is diverted into the side stripping section and the rest of the remainder is discharged into the fractionating zone next below, a very accurate, quick and simple control of the operation of the tower may be effected. It will be seen from the following description that I do not maintain a definite fixed ratio between the quantity of reflux liquid diverted into a side stripping section and the quantity of reflux liquid passing on down through the tower regardless of variations in the total quantity of reflux liquid, as has been proposed prior to my invention, but rather I prefer to permit this ratio to vary with variations in the quantity of reflux flowing through the tower or with the quantity of vapor passing through the tower and to control the product withdrawn at any side section by means of a valve interposed in the means for conveying the predetermined quantity of reflux liquid from one fractionating zone of the tower to the zone immediately below, said valve being adapted to vary the flow through this means either automatically in accordance with variations in the temperature within the tower between the two zones or by manual manipulation.

With my improved apparatus and method adjustment of the side stream controls may be made automatically or they may be conveniently adapted to be operated from a common control point on the ground. This feature is particularly important in present day multi-stream towers from which six or more side streams are taken off and which are often over one hundred feet high. The height of these towers makes the adjustment of the side stream controls, with present day equipment, a task of considerable labor and one which takes considerable time. Frequently many trips to the top of the tower are required before the tower operation is balanced and suitable side stream products obtained. It also frequently happens that before the operator can make the necessary changes in the controls to compensate for a change in the conditions within the tower the necessity for such change will have passed and a very considerable quantity of off specification side stream products will have been produced.

It is among the objects of my invention therefore to provide an improved method of fractional distillation and operation of bubble towers in which the side streams are automatically controlled in accordance with changes in the temperature in the tower at the point at which the side stream is withdrawn from the main vapor path through the tower.

Among the other objects of my invention are: the provision of an improved method for automatically controlling and maintaining constant the properties of the side streams which are withdrawn from a bubble tower; the provision of means, operable from a common control point whereby the necessary side streams adjustment may be made immediately upon the necessity for such changes being indicated; and the provision of a fractionating tower having an improved adjustable seal for separating out a portion of the reflux liquid and discharging the separated product liquid into a rectifying section.

The above and other objects of my invention will appear from the following description of several embodiments thereof, reference being had to the following drawings, in which—

Figure 1 is a vertical cross section through a portion of a fractionating tower embodying my apparatus and adapted to carry out my method, the section being taken on line 1—1 of Figures 2 and 3.

Figure 2 is a vertical cross section through the center of a portion of the tower of Figure 1 taken on line 2—2 of Figure 1.

Figure 3 is a horizontal cross sectional view of my tower taken on line 3—3 of Figure 1.

Figure 4 is a horizontal cross sectional view taken on line 4—4 of Figure 1.

Figure 5 is a horizontal cross sectional view taken on line 5—5 of Figure 1.

Figure 6 is a horizontal cross section of a slightly modified form of my tower taken on line 6—6 of Figure 7.

Figure 7 is a vertical cross section of my fractionating tower illustrating a centralized manual control system for the reflux flow and taken on line 7—7 of Figure 6.

Figure 8 is an enlarged plan view of my improved reflux dividing and distributing device.

Figure 9 is a vertical cross section through the rotary dividing device shown in Figure 8 and taken on line 9—9 of Figure 8.

Referring now to the drawings, the general arrangement of my tower is best seen in Figures 1 to 5 inclusive in which I have illustrated a portion of a tower embodying my improvements. In these figures there is illustrated one complete fractionating zone or section A and portions B and C of the fractionating zones or sections immediately above and below zone A. Although I have illustrated only one complete zone and portions of the adjacent zones it will be understood by those skilled in the art that the complete tower will be made up of one fractionating zone for each side stream which is to be removed. Thus, if there are to be seven side streams taken from the tower seven separate fractionating zones, each generally similar to zone A, will be provided.

Referring particularly to Figure 2, the tower comprises a cylindrical shell 1 in which are disposed a plurality of bubble trays of the usual type, each tray having a number of chimneys 2 and each chimney having a bubble cap 3 disposed thereover and adapted to direct the vapors which pass up through the chimneys down into the reflux liquid on the tray thus causing the vapor to bubble through the liquid to obtain the desired condensation. The fractionating zone A of the tower is divided by a vertical wall 4 into a main fractionating zone and a side stream rectifying section D. The wall 4 extends upwardly from the lowest bubble tray of section A to a point between the top tray of section A and the bottom tray of section B. Section B also includes a side stream rectifying section E which is formed by the partition wall 5 and section C includes the stripping section F formed by the partition wall 6.

It will be seen from Figure 2 that stripping section F is of larger cross sectional area than section D and section D is of larger cross sectional area than section E. This is in accordance with the teachings of the above noted Garrison application and results in a vapor path through the main fractionating portion of the tower, the cross sectional area of which increases at each fractionating zone from the bottom to the top of the tower. Thus, fractionating trays in zone C are smaller in cross sectional area and are provided with a smaller number of bubble caps than the trays of zone A and the trays of zone A are provided with a smaller number of bubble caps and are of smaller cross sectional area than the trays of zone B.

In describing the flow of reflux liquid through the tower and the withdrawal of a side stream therefrom it will only be necessary to refer to fractionating zones A and C because the flow of reflux liquid through any zone is substantially the same as that through any other zone. The side stream stripping section D receives its liquid through the special downpour pipe 7 which has its lower end disposed in the adjustable distributing seal 8. As is seen in Figure 2 this distributing seal 8 is disposed directly over the top edge of the wall 4, which separates the rectifying section D from the fractionating zone A, and is adapted to discharge a portion of the liquid from the downpour pipe 7 into the section D and the remainder of the liquid onto the top bubble tray 9 of zone A. This top bubble tray 9 is provided with sloping downpour pipes 10 (see Figure 7) which take the reflux fluid from adjacent the edges of the tray and discharge it onto the next tray below at a point adjacent the center. On this tray 12, as is seen in Figure 5, reflux liquid flows over the surface of the tray and around the ends of the baffle walls 11 and is carried down to the next tray 13, below, by its downpour pipes 10. The flow of reflux between trays 9, 12, 13 and 14 is the same as has just been described. The downpour pipes 16, however, from tray 15 to tray 17 are vertical instead of disposed at an angle and discharge reflux liquid onto tray 17 adjacent the shell 1 (see Figure 7).

As will be best seen in Figure 4 the liquid which is discharged through the pipes 16' and 16 will pass around the ends of baffle walls 18 and 18' toward the center of the trays 17' and 17 and, after passing over baffle walls 19 and 19' which regulate the depth of reflux liquid on the trays, the reflux passes down through the special downpour pipes 7 and 7' into the dividing and distributing seals 8 and 8'. Thus, the reflux from the bottom tray 17 of the fractionating zone A will be discharged into the distributing device 8' and will be divided so that a portion is discharged into the rectifying section F and the remainder onto the top tray 20 of zone C.

Each of the side stream rectifying sections D, E and F are provided with bubble trays, preferably extensions of the main fractionating zone bubble trays as indicated in the drawings. These trays are equipped with chimneys and bubble caps 22 in the usual manner and are provided with downpour pipes 23 (Figure 1) arranged in offset relation to provide the proper flow over the bubble trays 21. The lower portion of each of the rectifying sections D, E and F forms a chamber in which the side stream may collect and in which the collected liquid is adapted to be subjected to the heat of the rising vapors which heat assists in the rectifying operation. Side stream withdrawal pipes 24 are provided at the bottom of each rectifying section to conduct the rectified products to a suitable place of collection and storage.

It will be noted that in addition to the special downpour pipes 7 and 7' which discharge into the adjustable distributing seals 8 and 8', I have provided reflux downpours 25 and 25'. The reflux downpour 25 takes a certain portion of the reflux fluid from the bottom tray of zone B and discharges it directly and entirely onto the top tray 9 of section A. In like manner the special downpour 25' takes a certain portion of the reflux liquid from the bottom tray 17 of zone A and discharges it directly and entirely onto the top tray 20 of zone C. These downpour pipes 25 and 25' are provided with valves 26 and 26' which are adapted to control the flow of reflux therethrough.

In Figure 2, I have diagrammatically illustrated the valves 26 and 26' as adapted to be operated by fluid pressure through the diaphragms 27 which are connected to operate the valves by rods 28. A common pressure fluid supply pipe 29 is adapted to supply the operating pressure to all of the diaphragms 27 and temperature controlled valves 30 are interposed between the pressure supply pipe 29 and the diaphragms 27. These pressure control valves are adapted to regulate and control the pressure applied to the diaphragms 27 and are responsive to variations in the temperature within the tower adjacent the downpour pipes 25 and 25'. Thermostatically responsive devices 31, of any suitable type, may be disposed within the space between the top and bottom bubble trays of adjacent sections and, as is diagrammatically illustrated, are connected to control the operation of the valves 30.

In Figure 7, I have illustrated a modified form of my apparatus in which the valves 26 and 26' are adapted to be operated by diaphragms 33 and 34 which are acted on by fluid pressure supplied through pipes 35 and 36, respectively. These pipes 35 and 36 preferably lead to a central control room and are provided with valves 37 and 38 which may be manually operated to vary the pressure on the diaphragms 33 and 34 and thus vary the setting of the valves 26 and 26' to regulate the amount of reflux flowing through the downpour pipes 25 and 25' of Figure 7.

In order that the operator may be advised as to temperature conditions existing within each zone of the tower, temperature indicating and/or recording devices 39 and 40, of any suitable type, are connected to temperature responsive elements 41 and 42 which are disposed within the tower between the bottom tray of zone B and the top tray of zone A and between the bottom tray of zone A and the top tray of zone C. In this form of my apparatus the operator may manipulate the valves 26 and 26' and thus maintain the temperature in each fractionating zone, as it is indicated to him by the instruments 39 and 40, at the desired point. In the form of my apparatus shown in Figures 1 to 5 inclusive, the valves 26 and 26' are connected to be automatically varied in accordance with changes in temperature within the different zones.

In Figures 8 and 9, I have shown in more detail the special adjustable distributing seal which has generally been referred to by the reference numeral 8. This seal is disposed above the top edge of the baffle wall 4 which forms the side stripping section D and comprises a cup shaped distributing and sealing member 8, having one portion 43 of its side wall extending up beyond the rest of the side wall 44. The member 8 is secured to the hub 45 of the bevel gear 46. A suitable vertical shaft 47 forms a bearing and support for the gear 46 and member 8. Another bevel gear 48 is keyed to the horizontal shaft 49 which has a bearing in a bracket 50 and which extends out through the side wall 1 of the tower. As is seen in Figure 2 a stuffing box 51 may be provided around the shaft 49 to prevent leakage of vapors and a hand wheel 52 may be provided to facilitate operation of the distributing device. As seen in Figure 8 the high portion 43 of the side wall of the cup member extends for approximately half of the circumference of the cup. When the cup is in the position shown in Figure 8 and reflux is discharged thereinto through the downpour pipe 7, the reflux will evenly overflow the curved horizontal edge 44 of the cup but will not overflow the edge 43. Thus, in Figure 8, by far the larger percentage of the reflux discharged into the cup will overflow the edge 44 on the left hand side of the wall 4 while the smaller percentage of the reflux will overflow the edge 44 on the right hand side of the wall 4. By turning the hand wheel 52 the cup may be rotated and it will be seen that rotation of the cup in clockwise direction (Figure 8) will increase the percentage of the total reflux entering the cup which is discharged on the right hand side of the wall 4 while rotating the cup in counter clockwise will decrease the percentage of reflux discharged on the right hand side of the wall 4. As the wall 4 in Figures 8 and 9 is disposed in the same position as in Figure 2 it will be seen that, in the position illustrated, a large part of the reflux discharged through pipe 7 will overflow onto the bubble tray 9 of zone A while a relatively small percentage will be discharged into the rectifying section D and withdraw as product.

In placing a fractionating tower of my improved type equipped with the manual control device shown in Figure 7 into operation the adjustable distributing seals 8, 8' etc. are positioned with respect to the partition walls which bound the rectifying sections so that approximately the desired quantity of liquid is deflected into each rectifying zone. In making these approximate adjustments for the withdrawal of the product liquid the valves 26, 26', etc. are preferably left in mid-position.

Referring particularly to the transfer of reflux from zone B to zone A the downpour pipe 25 may be proportioned with respect to downpour pipe 7 so that it will carry a predetermined quantity of the total descending reflux liquid, for example, 25%. After the seal 8 is adjusted for approximate operating conditions the valve 26 may be adjusted from the control room by manipulation of the valve 37 to provide a product of the desired specification which will be withdrawn from the pipe 24 at the bottom of the stripping section D.

In order that the operation and advantages of my apparatus may be more fully understood an example will be given using assumed values for purposes of illustration. If the downpour pipe 25 has a capacity of approximately 25% of the total reflux, when the valve 26 is in mid position pipe 25 will carry about 12% and pipe 7 about 88% of the total reflux liquid. If we assume that the product desired to be withdrawn is about 10% of the total reflux liquid the seal 8 will be set to discharge about 89% of the liquid which it carries into the lower fractionating zone A and about 11% of the liquid which it carries into the rectifying section D. When one or more of the side stream withdrawals of the tower are set the column is allowed to reach approximate equilibrium. If after the product is tested it is found to have too high an end boiling point the remotely controlled valve 26 may be opened to allow more reflux to descend directly into the lower fractionating zone. Conversely, if the product has too low an end boiling point the valve 26 may be closed. Adjustments are thus made of valve 26 until the desired product is obtained. Because of my arrangement for controlling the proportions of reflux and side stream to give the desired product it is not necessary for the operator to leave the control room to regulate the fractionating tower to obtain products which come within the desired specification.

If either the operating conditions of the still which heats the oil supplied to the tower or the character of the oil being processed changes, the operator may easily make the required adjustment from the control room by manipulation of the valves 37, 38, etc. Inasmuch as the character and boiling range of the product withdrawn from the pipe 24 depends upon the temperature of the vapor and liquid on the tray 9 (the uppermost tray of the next lower fractionating zone) the valve 26 may be automatically and thermostatically controlled by apparatus such as is shown in Figures 1 to 5 inclusive to maintain a predetermined temperature on the tray 9.

The character of the product withdrawn as a tower side stream is determined by the temperature in the tower at the point of withdrawal and not by volume of descending reflux. Various schemes have been proposed by which the ratio of the quantity of reflux liquid withdrawn as a product to the quantity of reflux descending to a lower fractionating zone is maintained at any determined ratio. An attempt has been made to obtain uniform specification products by maintaining the established ratio for any given product. Reasonably satisfactory results have been obtained where specifications were not too exacting. Various types of adjustable weirs, flow boxes, etc. have been used, all based on the mistaken theory that it is sufficient to maintain a constant ratio between reflux and product regardless of variations in still operation. A reasonable example is—if the hot oil and vapor entering the lower part of the column be subjected to a temperature increase of 50° or the quantity be increased 10% at the same temperature, more heat will be added to the tower and this will cause increased vaporization at all the side stream sections causing all the products to have a too high boiling range. This condition is not corrected until the increased heat reaches the top of the tower where the quantity of reflux is increased to maintain the fixed temperature (usually thermostatic control). The increased reflux liquid then descends the tower and corrects the temperature conditions at the side stream sections. The usual tendency is to over-correct and cause too low a temperature, in turn causing the product to have too low a boiling range; the over correction is particularly evident if in the meantime the heat input to the bottom of the tower has returned to normal.

My method of controlling the side stream products permits quick adjustment of the valves 26, 26′, etc. to correct the conditions illustrated. I may also make valves 26, 26′ etc. automatic thermostatically controlled valves and secure instant automatic correction for each successive product.

When only one or two side streams were withdrawn from a tower, so called ratio division of the reflux liquid gave reasonably satisfactory results, the usual products having considerable tolerance in specification. The condition cited in the above example was not so serious because with the shorter towers and fewer side streams, a reasonable balance of operating conditions was usually reached before the product tank was "off specification". The product tank usually held twenty-four hour's production and tended to average irregularities.

In present practice seven or more side stream products are commonly required. These products usually have rigid specifications, including initial boiling point, intermediate boiling points and end boiling point. Because of the number of distinct products, there must be a sharp division between them, therefore, close fractionation under all conditions. Ordinary ratio division of the reflux liquid cannot correct operation variations soon enough in multiple stream towers and frequently several product tanks are "off specification". With my method, whether the control of valves 26 and 26′ be manual or automatic, it is always under the operator's immediate control. Thermometers may be provided in the control room which register the temperature of the hot oil and vapor entering the tower, also the temperature in the tower at each side stream section and the top of the tower and accordingly the operator can readily adjust the several valves 26, 26′, etc. to maintain the desired temperature at each tower section.

I have described in detail the forms of my invention illustrated in the accompanying drawings. It will be understood by those skilled in the art, however, that modifications and variations may be made in the described forms of my invention without departing from the spirit thereof. I do not, therefore, wish to be limited to the specific arrangements herein shown and described but claim as my invention all embodiments thereof coming within the scope of the appended claims.

I claim:

1. In a fractionating tower of the type described, superimposed fractionating sections, a rectifying section in said tower below one of said fractionating sections, two downpour pipes extending from the bottom of the upper of said fractionating sections and adapted to convey reflux liquid therefrom, means for dividing the reflux conveyed by one of said downpour pipes and discharging part thereof into said rectifying section and the remainder into the lower fractionating section, the other downpour pipe being adapted to discharge entirely to the lower fractionating section, valve means for controlling the flow of reflux through said other of said downpour pipes and means disposed at a remote point for controlling said valve means.

2. In a fractionating tower of the type described, superimposed fractionating sections, a rectifying section in said tower below one of said fractionating sections, two downpour pipes extending from the bottom of the upper of said fractionating sections and adapted to convey reflux liquid therefrom, means for dividing the reflux conveyed by one of said downpour pipes and discharging part thereof into said rectifying section, and the remainder into the lower fractionating section, the other downpour pipe being adapted to discharge entirely to the lower fractionating section, valve means adapted to control the flow of reflux liquid through the other of said downpour pipes, and temperature controlled means for operating said valve whereby the flow through said other downpour pipe will vary in accordance with variations in the temperature in the tower substantially at the bottom of said upper fractionating zone.

3. In a fractionating tower having a side stream rectifying section, a partition wall adapted to separate said rectifying section from the body of the tower, an adjustable seal disposed above the top edge of said partition wall, a downpour pipe adapted to discharge reflux liquid into said seal, said adjustable seal including a rotatable cup having one portion of its side wall higher than the rest of the side wall and means, operable from outside of said tower for rotating said cup whereby the percentage of the total reflux entering the cup which overflows the low portion of the side wall and is discharged into the rectifying section may be varied.

4. In a multiple stream fractionating tower of the type described having superimposed fractionating sections and a rectifying section below one of said fractionating sections, two downpour pipes between adjacent fractionating sections, an adjustable seal at the lower end of one of said downpour pipes, said seal being adapted to discharge liquid received from the downpour pipe disposed thereabove partly into said rectifying section and partly into the lower fractionating section, the other of said downpour pipes being adapted to discharge entirely to said lower fractionating section, a valve for controlling the flow through said other of said downpour pipes, and automatic means, responsive to the temperature in the tower substantially at the level of said downpour pipes, for operating said valve.

5. In a fractionating tower having superimposed fractionating trays and a rectifying section below one of said trays, two downpour pipes from said one of said trays, one of said pipes being adapted to conduct liquid from said tray to a tray below, a valve in said pipe, temperature controlled means, responsive to the temperature in the tower substantially at the level of said downpour pipes, for operating said valve, and flow dividing means for directing part of the liquid delivered thereto to said rectifying section and part to a tray below the tray from which the liquid was withdrawn, the other of said downpour pipes being adapted to conduct liquid to said flow dividing means.

6. In a fractionating tower having superimposed fractionating trays and a rectifying section below one of said trays, two downpour pipes from said one of said trays, one of said pipes being adapted to conduct liquid from said tray to a tray below, a valve in said pipe, temperature controlled means, responsive to the temperature in the tower substantially at the level of said downpour pipes, for operating said valve, flow dividing means for directing part of the liquid delivered thereto to said rectifying section and part to a tray below the tray from which the liquid was withdrawn, the other of said downpour pipes being adapted to conduct liquid to said flow dividing means, and means for adjusting said flow dividing means to vary the proportion of liquid delivered to said rectifying section and to said lower tray.

7. In a fractionating tower having superimposed fractionating trays and a rectifying section below one of said trays, two downpour pipes from said one of said trays, one of said pipes being adapted to conduct liquid from said tray to a tray below, a valve in said pipe, means for operating said valve, and flow dividing means for directing part of the liquid delivered thereto to said rectifying section and part to a tray below the tray from which the liquid was withdrawn, the other of said downpour pipes being adapted to conduct liquid to said flow dividing means.

8. In a fractionating tower having superimposed fractionating trays and a rectifying section below one of said trays, two downpour pipes from said one of said trays, one of said pipes being adapted to conduct liquid from said tray to a tray below, a valve in said pipe, means for operating said valve from a remote point, and flow dividing means for directing part of the liquid delivered thereto to said rectifying section and part to a tray below the tray from which the liquid was withdrawn, the other of said downpour pipes being adapted to conduct liquid to said flow dividing means.

9. In a fractionating tower having superimposed fractionating trays and a rectifying section below one of said trays, two downpour pipes from said one of said trays, one of said pipes being adapted to conduct liquid from said tray to a tray below, a valve in said pipe, means for operating said valve, flow dividing means for directing part of the liquid delivered thereto to said rectifying section and part to a tray below the tray from which the liquid was withdrawn, the other of said downpour pipes being adapted to conduct liquid to said flow dividing means, and means for adjusting said flow dividing means to vary the proportion of liquid delivered to said rectifying section and to said lower tray.

10. In a fractionating tower having superimposed fractionating trays and a rectifying section below one of said trays, two downpour pipes from said one of said trays, one of said pipes being adapted to conduct liquid from said tray to a tray below, a valve in said pipe, means for operating said valve from a remote point, flow dividing means for directing part of the liquid delivered thereto to said rectifying section and part to a tray below the tray from which the liquid with withdrawn, the other of said downpour pipes being adapted to conduct liquid to said flow dividing means and means for adjusting said flow dividing means to vary the proportion of liquid delivered to said rectifying section and to said lower tray.

11. In apparatus of the type described, a tower having a plurality of superimposed fractionating trays, means for rectifying material withdrawn from one of said trays, two pipes leading from said one of said trays, a flow dividing means for directing part of the liquid delivered thereto to said rectifying means and part to a tray below the tray from which the liquid was withdrawn, one of said pipes being adapted to conduct liquid to said flow dividing means and the other of said pipes being adapted to direct liquid to said tray below the tray from which the liquid was withdrawn, a valve in said other pipe, and means for operating said valve to control the flow through said other pipe.

FREDERICK W. STONE.